United States Patent [19]

Segawa et al.

[11] Patent Number: 4,498,163
[45] Date of Patent: Feb. 5, 1985

[54] DIAMOND PICKUP STYLUS WITH GOOD GRINDABILITY

[75] Inventors: Keiji Segawa, Sagamihara; Mikio Naoi, Tokyo; Masaki Murakami, Sagamihara, all of Japan

[73] Assignee: Victor Company of Japan, Limited, Japan

[21] Appl. No.: 403,346

[22] Filed: Jul. 30, 1982

[30] Foreign Application Priority Data

Jul. 30, 1981 [JP] Japan .................................. 56-119550

[51] Int. Cl.³ ............................ G11B 9/00; G11B 3/00
[52] U.S. Cl. ..................................... 369/126; 369/173
[58] Field of Search ................................ 369/126, 173

[56] References Cited

U.S. PATENT DOCUMENTS

| | | | |
|---|---|---|---|
| 3,848,876 | 11/1974 | Joschko et al. | 369/173 |
| 3,871,664 | 3/1975 | Huges | 369/173 |
| 3,877,705 | 4/1975 | Joschko et al. | 369/173 |
| 4,199,782 | 4/1980 | Wada et al. | 369/126 |
| 4,273,967 | 6/1981 | Wada et al. | 369/50 X |
| 4,340,954 | 7/1982 | Chio et al. | 369/173 |
| 4,357,699 | 11/1982 | Takehara et al. | 369/126 X |

FOREIGN PATENT DOCUMENTS

| | | | |
|---|---|---|---|
| 2060317 | 6/1972 | Fed. Rep. of Germany | 369/173 |
| 2319407 | 11/1974 | Fed. Rep. of Germany | 369/173 |
| 0137534 | 10/1981 | Japan | 369/126 |
| 0137535 | 10/1981 | Japan | 369/126 |

*Primary Examiner*—Aristotelis M. Psitos
*Attorney, Agent, or Firm*—Lowe, King, Price & Becker

[57] ABSTRACT

An electrostatic capacitance type pickup stylus for use on an information storage disc comprises a crystal of diamond including a sliding face for slidable contact with the information storage disc, an electrode face supporting thereon a conductive electrode layer for detecting signals on the information storage disc as changes in electrostatic capacitance, a pair of first and second angularly spaced back faces adjoining the electrode face, and a pair of first and second angularly spaced guide faces adjoining each other and the first and second back faces, respectively. The sliding face is in the form of a pentagon defined by ridges respectively of the electrode face, first and second back faces, and first and second guide faces, the first and second back faces being symmetrical with respect to a line passing through a central point on the ridge of the electrode face and a junction between the ridges of the first and second guide faces, the first and second guide faces being symmetrical with respect to the line. The first and second back and guide faces are located in areas in which they can easily ground without causing damages to ridges between the adjoining faces.

1 Claim, 4 Drawing Figures

DIAMOND PICKUP STYLUS WITH GOOD GRINDABILITY

BACKGROUND OF THE INVENTION

The present invention relates to an electrostatic capacitance type pickup stylus slidably movable on an information storage medium or disc for detecting signals recorded in the form of minute pits along spiral or circular tracks on the disc.

Information storage mediums or discs such as video discs contain signals in the form of minute pits recorded along spiral or circular tracks at a high density. The signals can be picked up by an electrostatic capacitance type pickup stylus which is slidably movable on the disc to detect changes in electrostatic capacitance which are dependent on the recorded signals. The pickup stylus has its end tapered to an extremely small diameter as the track pitch on the disc is small and the wavelengths of the recorded signals are quite short. While the disc is being played, the tapered end of the pickup stylus is held in frictional engagement with the disc which rotates at a high speed. Accordingly, the pickup stylus of the electrostatic capacitance type tends to be worn relatively rapidly.

Various attempts have heretofore been made to fabricate electrostatic capacitance type pickup styli which have a longer service life so that they need to be replaced less frequently. Such pickup styli are generally made of naturally occurring diamond or artificial diamond which is cut and ground to desired contour. Presently available diamond pickup styli are however disadvantageous in that they have ground faces which are relatively poor in grindability and a sliding face having an irregular wear-resistant property, and their longevities vary from stylus to stylus. Fabrication of such diamond pickup styli is costly as it requires a time-consuming and complex grinding process.

SUMMARY OF THE INVENTION

It is an object of the present invention to provide an electrostatic capacitance type pickup stylus having faces that are easily grindable without causing damage to the edges of electrode layer and ridges between adjoining faces.

Another object of the present invention is to provide an electrostatic capacitance type pickup stylus which is more uniform in wear resistance.

According to the present invention, an electrostatic capacitance type pickup stylus for use on an information storage disc comprises a crystal of diamond including a sliding face for slidable contact with the information storage disc, an electrode face supporting thereon a conductive electrode layer for detecting signals on the information storage disc as changes in electrostatic capacitance, a pair of first and second angularly spaced back faces adjoining the electrode face, and a pair of first and second angularly spaced guide faces adjoining each other and the first and second back faces, respectively. The sliding face is in the form of a pentagon defined by ridges respectively of the electrode face, first and second back faces, and first and second guide faces, the first and second back faces being symmetrical with respect to a line passing through a central point on the ridge of the electrode face and a junction between the ridges of the first and second guide faces, the first and second guide faces being symmetrical with respect to the line. The first back face is disposed in an area defined between ($\bar{1}$11) and ($\bar{1}$01) faces of the diamond crystal and in an angular interval of about ±15 degrees across a direction from the ($\bar{1}$11) face to the ($\bar{1}$01) face. The second back face is disposed in an area defined between (1$\bar{1}$1) and (0$\bar{1}$1) faces of the diamond crystal and in an angular interval of about ±15 degrees across a direction from the (1$\bar{1}$1) face to the (0$\bar{1}$1) face. The first guide face is disposed in an area defined between (01$\bar{1}$) and (010) faces of the diamond crystal and in an angular interval of about ±15 degrees across a direction from the (01$\bar{1}$) face to the (010) face. The second guide face is disposed in an area defined between (10$\bar{1}$) and (100) faces of the diamond crystal and in an angular interval of about ±15 degrees across a direction from the (10$\bar{1}$) face to the (100) face.

BRIEF DESCRIPTION OF THE DRAWINGS

The present invention will be described in detail by way of illustrative example with reference to the accompanying drawings, in which.

DETAILED DESCRIPTION

Figure 1:
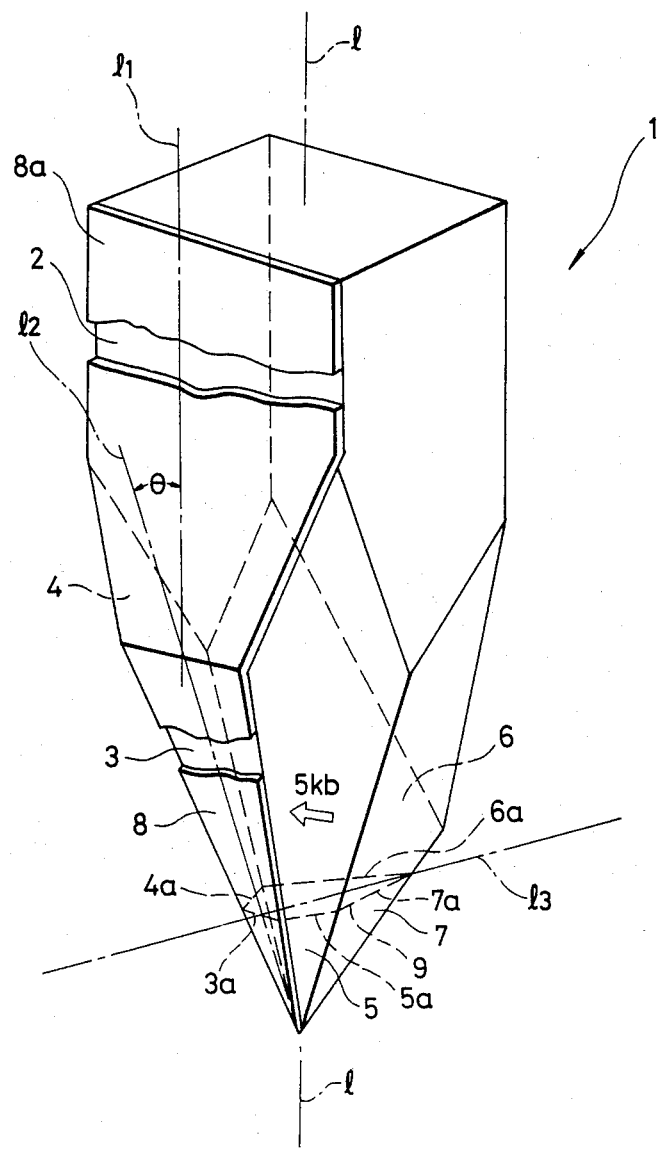
FIG. 1 is a perspective view of an electrostatic capacitance type pickup stylus to which the present invention is applicable.

As shown in FIG. 1, an electrostatic capacitance type pickup stylus 1 according to the present invention is in the form of a rectangular parallelepiped of diamond which is ground to define an electrode face 3, a pair of symmetrical backs 4, 5, and a pair of guide faces 6, 7. The pickup stylus 1 also has a reference face 2 with respect to which the electrode face 3 extends at an angle of $\theta$ such as 15 degrees. An electrode is composed of continuous conductive layers 8, 8a deposited respectively on the electrode and reference faces 3, 2. The electrode face 3 is defined by and between the backs 4, 5. The pickup stylus 1 has an axis l. The reference face 2 has a central axis $l_1$, and the electrode face 3 has a central axis $l_1$. A distal end portion of the pickup stylus 1 is cut off to define a sliding face 9 which extends normally to the axis l. The sliding face 9 is held in slidable contact with the information storage disc while the latter is being played. Ridges 3a, 4a, 5a, 6a and 7a extending around the sliding face 9 on the faces 3, 4, 5, 6 and 7 jointly form a pentagon that is symmetrical with respect to a line $l_3$ passing through a central point on the ridge 3a and a junction between the ridges 6a, 7a.

Figure 2:
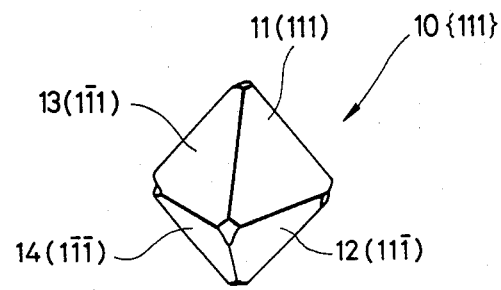
FIG. 2 is a perspective view of a typical crystal of naturally occurring diamond in the form of an octahedron from which the blank of an electrostatic capacitance type pickup stylus can be cut out.

FIG. 2 illustrates a typical crystal 10 of naturally occurring diamond in the octahedron form from which a rectangular parallelepiped can be cut out as a blank for forming an electrostatic capacitance type pickup stylus. The octahedron diamond form can be represented by the Miller indices of {111}. The diamond crystal 10 has adjoining faces 11, 12, 13, 14 which can be represented by the indices of (111), (11$\bar{1}$), (1$\bar{1}$1), (1$\bar{1}\bar{1}$), respectively. Throughout the following description, the Miller's system which is well known in the crystallographic field will be utilized to denote various faces of an electrostatic capacitance type pickup stylus.

Figure 3:
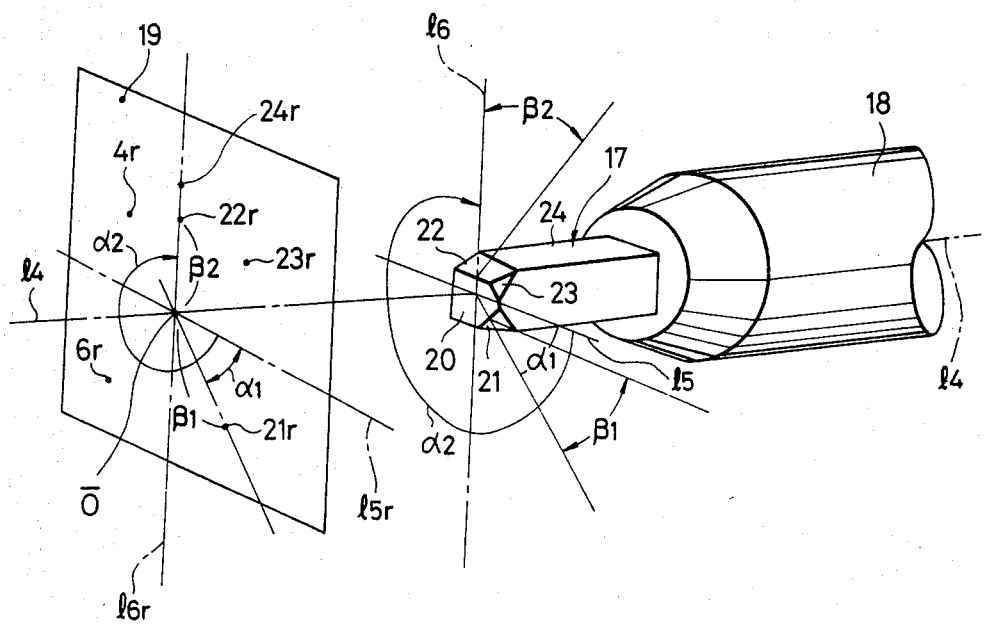
FIG. 3 is a perspective view of a stylus blank, showing faces to be ground and a stereographic projection of such faces.

As shown in FIG. 3, a blank 17 cut out of the diamond crystal 10 (FIG. 2) is affixed as by silver solder to a shank 18, and ground to desired contour such as shown in FIG. 1, which includes the faces 3 through 7. The blank 17 has an end face 20 which is ground to define faces 21, 22 and 23, and a side face 24, the faces 21, 22, 23 and 24 corresponding to the faces 7, 3, 5 and 2, respectively, of the ground pickup stylus 1 shown in FIG. 1. The blank 17 has a longitudinal axis $l_4$ which extends coaxially with the shank 18 and perpendicularly to the end face 20. An axis $l_5$ extends parallel to the face 24 and across the axis $l_4$, and an axis $l_6$ intersects the axes $l_4$ and $l_5$ at right angles.

A phantom plane 19 which lies parallel to the face 20 is utilized to show a stereographic projection of the ground faces on the blank 17 in terms of of polar coordinates. The axis $l_4$ extends perpendicularly to the plane 19, the axes $l_{5r}$, $l_{6r}$ correspond respectively to the axes $l_5$, $l_6$. On the plane 19, the face 20 is designated as a center point or pole $\overline{O}$. The face 21 is angularly spaced by an angle of $\alpha_1$ from the axis $l_5$ and by an angle of $\beta_1$ from the plane including the face 20. The face 21 can be designated as a point $21r$ which is angularly spaced by the angle of $\alpha_1$ from the axis $l_{5r}$ and is spaced by an interval of $\beta_1$ from the pole $\overline{O}$. Likewise, the faces 22, 23, 24 can be indicated on the plane 19 as points $22r$, $23r$, $24r$, respectively. The faces 6 and 4 on the pickup stylus 1 shown in FIG. 1 can also be denoted on the plane 19 as points $6r$ and $4r$, respectively, which are the mirror images of the points $21r$ and $23r$ with respect to the axis $l_{6r}$.

Figure 4:
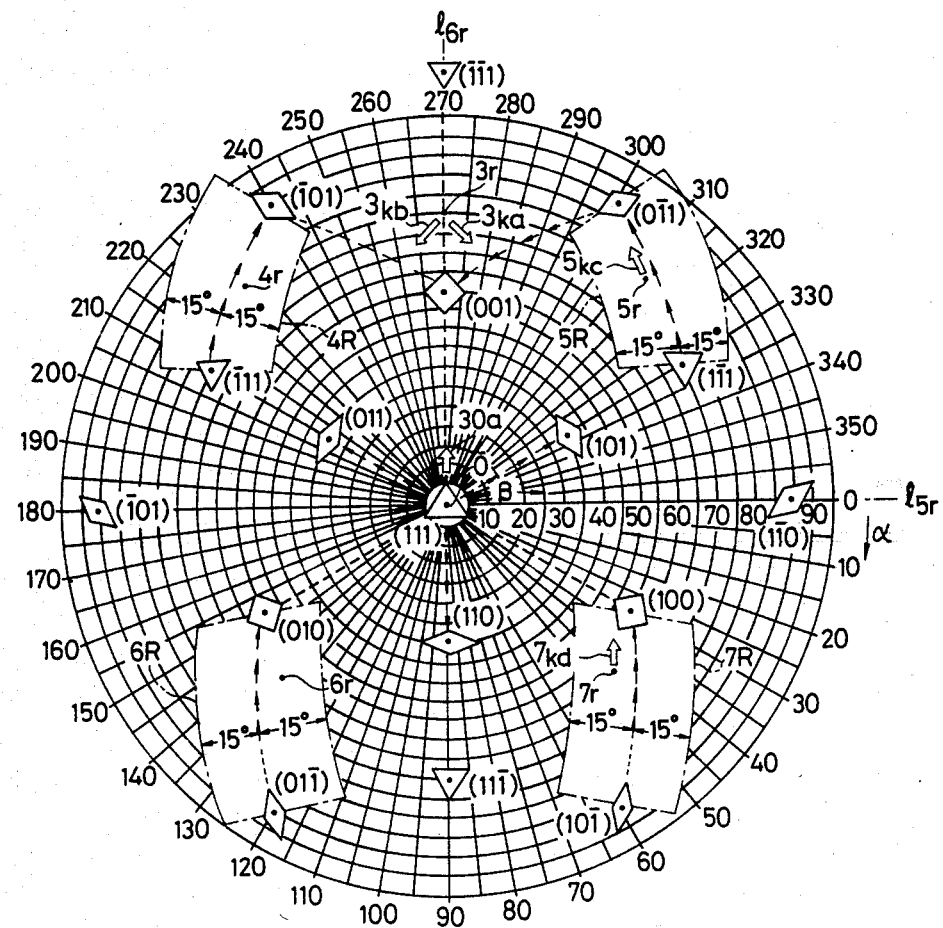
FIG. 4 is a stereogram illustrative of various faces of an electrostatic capacitance type pickup stylus according to the present invention.

FIG. 4 is a stereogram of various faces of an electrostatic capacitance type pickup stylus according to the present invention. The pickup stylus of the invention has an end sliding face (which corresponds to the face 9 in FIG. 1 and the face 20 in FIG. 3) that is represented by the indices (111). The axes $l_5$ and $l_6$ in FIG. 3 extend in the directions [110] and [001], respectively. The faces 3, 4, 5, 6 and 7 of the pickup stylus 1 shown in FIG. 1 are indicated as points $3r$, $4r$, $5r$, $6r$ and $7r$, respectively, in FIG. 4. The angle $\alpha$ is graduated circumferentially along the primitive circle, starting from the axis $l_{5r}$. The angle $\beta$ is graduated along a radius on the axis $l_{5r}$, starting from the center point $\overline{O}$. Successive solid-line arrows in FIG. 4 indicate directions of better grindability, and their lengths represent degrees of better grindability.

The electrode face 3, which is indicated as the point $3r$ in FIG. 4, can easily be ground within an angle range of from 35 to 55 degrees with respect to the axis $l_{6r}$. The face 3 is ground in the directions of $3ka$ and $3kb$ along which grindability is better under the influence of easier grindability of the face (001).

The back faces 4, 5, indicated as the points $4r$, $5r$, respectively, in FIG. 4, are positionally symmetrical with respect to the axis $6r$, and hence the back face 5 will be described in more detail. The back face 5 is present between faces ($1\overline{1}1$) and ($0\overline{1}1$), and can easily be ground along a direction extending from the face ($1\overline{1}1$) to the face ($0\overline{1}1$). Accordingly, the back face 5 is easily ground in the direction of the arrow $5kc$, which is substantially in conformity with the direction of the arrow $5kb$ in FIG. 1. When the back face 5 is ground along the arrow $5kb$, the edge of the conductive layer 8 on the face 3 is less liable to become damaged by ground particles of diamond which are produced during grinding operation. The face 4 is present between faces ($\overline{1}01$) and ($\overline{1}11$), and can easily be ground in the direction from the face ($\overline{1}11$) toward the face ($\overline{1}01$).

The face 7, or the point $7r$ in FIG. 4, is present between faces (100) and ($10\overline{1}$) and located closer to the face (100). The face 7 can easily be ground along the direction of the arrow $7kd$ without damaging the ridge between the faces 6, 7. The face 6 which is the point $6r$ in FIG. 4 is positioned between faces (010) and ($01\overline{1}$), and can easily be ground in the direction which extends from the face ($01\overline{1}$) to the face (010) without causing damages to the ridge between the faces 6, 7.

The direction in which the pickup stylus moves relatively to the information storage disc is indicated by the arrow $30a$ in FIG. 4. Since the diamond crystal is mst resistant to wear in the direction $30a$, the sliding face 9 which is in the vicinity of the face (111) is highly wear-resistant. Accordingly, the pickup stylus of the invention has improved wear resistance and a longer service life. Directions of better and worse grindability are alternately present on the face (111) at angular intervals of 60 degrees, which are larger than those in the sliding face of conventional pickup styli. The wear resistance property of the sliding face is more uniform even if it is angularly displaced from the position the face (111) assumes in FIG. 4.

The ground faces of the pickup stylus according to the present invention may lie in different planes angularly shifted in the following ranges: The back face 4 is present in a rectangular area 4R defined between the faces ($\overline{1}11$) and ($\overline{1}01$) and in an angular interval of about $\pm 15$ degrees across the direction from the face ($\overline{1}11$) toward the face ($\overline{1}01$). The back face 5 is present in a rectangular area 5R defined between the faces ($1\overline{1}1$) and ($0\overline{1}1$) and in an angular interval of about $\pm 15$ degrees across the direction from the face ($1\overline{1}1$) toward the face ($0\overline{1}1$). The guide face 6 is located in a rectangular area 6R extending between the faces ($01\overline{1}$) and (010) and in an angular interval of about $\pm 15$ degrees across the direction from the face ($01\overline{1}$) toward the face (010). Likewise, the guide face 7 is located in a rectangular area 7R extending between the faces ($10\overline{1}$) and (100) and in an angular interval of about $\pm 15$ degrees across the direction from the face ($10\overline{1}$) toward the face (100). If the guide and back faces were positioned outside of these rectangular areas having an angular interval of about $\pm 15$ degrees, then the grindability of the faces would become progressively poorer in a direction away from the areas. The grindability of the faces would be much worse or practically infeasible if the faces were largely spaced away from these rectangular areas.

The electrostatic capacitance type pickup stylus of the invention may be fabricated of a blank of artificial diamond having faces (111) and (100) which is secured by suitable metal solder to a rod of metal such as titanium, with the (111) face serving as a sliding face.

Although a certain preferred embodiment of the present invention has been shown and described in detail, it should be understood that various changes and modifications may be made therein without departing from the scope of the appended claims.

What is claimed is:

1. An electrostatic capacitance type pickup stylus for use on an information storage disc, comprising a crystal of diamond including a sliding face for slidable contact with the information storage disc, an electrode face supporting thereon a conductive electrode layer for detecting signals on the information storage disc as changes in electrostatic capacitance, a pair of first and second angularly spaced back faces adjoining said electrode face, and a pair of first and second angularly spaced guide faces adjoining each other and said first and second back faces, respectively, said sliding face being in the form of a pentagon defined by ridges respectively of said electrode face, first and second back faces, and first and second guide faces, said first and second back faces being symmetrical with respect to a line passing through a central point on the ridge of said electrode face and a junction between the ridges of said first and second guide faces, said first and second guide faces being symmetrical with respect to said line, said first back face being disposed in an area defined between ($\bar{1}11$) and ($\bar{1}01$) faces of the diamond crystal and in an angular interval of about ±15 degrees across a direction from said ($\bar{1}11$) face to said ($\bar{1}01$) face, said second back face being disposed in an area defined between ($1\bar{1}1$) and ($0\bar{1}1$) faces of the diamond crystal and in an angular interval of about ±15 degrees across a direction from said ($1\bar{1}1$) face to said ($0\bar{1}1$) face, said first guide face being disposed in an area defined between ($01\bar{1}$) and (010) faces of the diamond crystal and in an angular interval of about ±15 degrees across a direction from said ($01\bar{1}$) face to said (010) face, and said second guide face being disposed in an area defined between ($10\bar{1}$) and (100) faces of the diamond crystal and in an angular interval of about ±15 degrees across a direction from said ($10\bar{1}$) face to said (100) face.

* * * * *